United States Patent
Devarakonda et al.

(10) Patent No.: US 8,332,360 B2
(45) Date of Patent: Dec. 11, 2012

(54) QOS-ENABLED LIFECYCLE MANAGEMENT FOR FILE SYSTEMS

(75) Inventors: Murthy V Devarakonda, Peekskill, NY (US); Konstantinos Magoutis, New York, NY (US); Norbert George Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 12/054,616

(22) Filed: Mar. 25, 2008

(65) Prior Publication Data

US 2008/0177810 A1 Jul. 24, 2008

Related U.S. Application Data

(63) Continuation of application No. 11/100,797, filed on Apr. 6, 2005, now abandoned.

(51) Int. Cl.
*G06F 17/30* (2006.01)
(52) U.S. Cl. .................... 707/652; 707/821
(58) Field of Classification Search ............ 707/652
See application file for complete search history.

(56) References Cited

U.S. PATENT DOCUMENTS

| | | | |
|---|---|---|---|
| 5,287,500 A * | 2/1994 | Stoppani, Jr. ............ | 711/211 |
| 6,742,020 B1 | 5/2004 | Dimitroff et al. | |
| 7,107,403 B2 | 9/2006 | Modha et al. | |
| 7,266,538 B1 | 9/2007 | Shatil | |
| 7,296,022 B2 | 11/2007 | Harjanto | |
| 7,392,234 B2 | 6/2008 | Shaath et al. ............ | 707/1 |
| 2002/0156867 A1 | 10/2002 | Iwami ............ | 709/218 |
| 2003/0055972 A1 | 3/2003 | Fuller et al. ............ | 709/226 |
| 2003/0079019 A1 * | 4/2003 | Lolayekar et al. ............ | 709/226 |
| 2003/0110242 A1 | 6/2003 | Brown et al. | |
| 2003/0135385 A1 | 7/2003 | Karpoff ............ | 705/1 |
| 2004/0068553 A1 | 4/2004 | Davis et al. | |
| 2004/0243692 A1 * | 12/2004 | Arnold et al. ............ | 709/220 |
| 2006/0010150 A1 | 1/2006 | Shaath et al. ............ | 707/102 |
| 2006/0129584 A1 * | 6/2006 | Hoang et al. ............ | 707/101 |

OTHER PUBLICATIONS

"Policy-Based Information Lifecycle Management in a Large-Scale File system"; Proceedigs of the sixth IEEE International Workshop on Policies for Distributed systems and Networks; Beigi et al.; IBM, 2005.*
Vanel, L., et al., "AIX Logical Volume Manager, from A to Z: Introduction and Concepts, Chapter 1, Components of the Logical Volume Manager", © IBM Corp. 2000, pp. 1-100.
Brooks, C., et al., "IBM Tivoli Storage Resource Manager: A Practical Introduction, Chapter 2, Introduction to IBM Tivoli Storage Resource Manager", © IBM Corp. 2003, pp. 23-44.

* cited by examiner

*Primary Examiner* — Christyann Pulliam
*Assistant Examiner* — Mellissa M Chojnacki
(74) *Attorney, Agent, or Firm* — Harrington & Smith (57) ABSTRACT

A method for lifecycle management for file systems has several steps. At least one storage container adapted to support a file system is allocated. The at least one storage container and the file system are associated with a service class. The file system is created in the storage container. The service class is used during lifecycle actions performed on the file system. Lifecycle actions may comprise, e.g., creating, extending, replicating, moving, or migrating a file system. The service class for the file system may also be maintained for a lifecycle of the file system.

28 Claims, 10 Drawing Sheets

QOS-ENABLED LIFECYCLE MANAGEMENT FOR FILE SYSTEMS

CROSS REFERENCE TO RELATED APPLICATION

This application is a continuation of U.S. patent application Ser. No. 11/100,797 filed Apr. 6 2005 now abandoned.

TECHNICAL FIELD

This invention relates generally to computer systems and, more specifically, relates to quality of service (QoS) for storage on computer systems.

BACKGROUND OF THE INVENTION

Storage in a computer system typically comprises file systems, although other storage such as databases may be used. File systems are generally implemented using operating systems that format storage containers such as hard disks in accordance with the file systems. File systems allow files to be named and located on a hard disk. The file systems also allow files to span non-contiguous sectors of the hard disk, yet be easily found, copied, modified, and deleted.

Existing widely-deployed file systems may be of different types, such as Window NT File System (NTFS) and UNIX file systems. Such file systems may also run on heterogeneous server platforms. However, today widely-deployed file systems usually do not support quality of service. Further, today's file systems do not support lifecycle management. But, quality of service is becoming more important for file systems, and as quality of service is becoming important, lifecycle management is also becoming important for file systems and other storage. Lifecycle management is already important in other fields and it would be beneficial to provide this management in storage for computer systems, but such management is not easily provided using conventional file systems.

What is needed then are techniques for creating file systems, while providing quality of service and maintaining quality of service during lifecycles of the file systems.

BRIEF SUMMARY OF THE INVENTION

The present invention provides for lifecycle management of file systems. In an exemplary aspect of the invention, a method is disclosed for lifecycle management for file systems. One or more storage containers are allocated. A file system is created on the one or more storage containers. The file system and the one or more storage containers are associated with a service class. The service class is used during lifecycle actions performed on the file system. Lifecycle actions may comprise, e.g., creating, extending, replicating, moving, or migrating a file system.

In another exemplary embodiment, an apparatus is disclosed for lifecycle management for file systems. The apparatus comprises at least one memory and at least one processor coupled to the at least one memory. The at least one processor is configured to allocate one or more storage containers associated with a service class in the at least one memory. A file system is created on the one or more storage containers, and the file system is associated with the service class. The at least one processor is additionally configured to use the service class during lifecycle actions performed on the storage.

In yet another exemplary embodiment, a signal bearing medium is disclosed that tangibly embodies a program of machine-readable instructions executable by a digital processing apparatus to perform operations for lifecycle management for storage. The operations comprise allocating one or more storage containers associated with a service class. The operations also comprise creating a file system in the storage container, where the file system is associated with the service class. The service class is used during lifecycle actions performed on the storage.

In another exemplary embodiment, an apparatus is disclosed that comprises means for allocating at least one storage container associated with a service class; means for creating a file system on the at least one storage container, wherein the file system is associated with the service class; and means for using the service class during lifecycle actions performed on the file system.

In yet another exemplary embodiment, a method for lifecycle management for file systems is disclosed. The method comprises allocating at least one storage container associated with a service class. A file system is created on the at least one storage container, wherein the file system is associated with the service class. The service class of the file system is maintained throughout a lifecycle of the file system.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 1, including

FIG. 3, including

FIG. 4, including

FIG. 5, including

FIG. 6, including

FIG. 7, including

FIG. 8, including FIG. 9, including

DETAILED DESCRIPTION OF EXEMPLARY EMBODIMENTS

Meeting quality of service (QoS) goals is becoming an important requirement for file systems in an on-demand environment, where quality of service goals may include goals corresponding to capacity, performance, and availability requirements. Besides the need to support a level of quality of service at the time of allocation of a file system, it is also beneficial to maintain the quality of service requirements throughout lifecycle of the file system, for example, whenever the file system has to be extended, replicated, moved, migrated, and/or deleted. Providing quality of service for existing types of file systems from different vendors at the time of creation of the file systems, as well as during lifecycles of the file systems, is a significant challenge.

Present attempts to solve to this challenge include the following: (1) Do nothing; (2) Use human-based and/or tool-based monitoring of file systems and perform manual provisioning and lifecycle management as needed; (3) Create a new file system type that is capable of quality of service support on heterogeneous systems and migrate existing data to this file system; and (4) Use scripts to add storage in response to out of space alerts.

The first proposed solution is generally not acceptable in an on demand environment. The second proposed solution can be expensive and is error prone. The third proposed solution has a disadvantage that this solution requires extensive development costs of a new file system type and risks that customers may not want to switch to a new file system. Finally, the fourth proposed solution has limited functionality and does not assure quality of service through the entire lifecycle.

Thus, there is a need for techniques that provide lifecycle management and quality of service for file systems. Before proceeding with a description of the present invention, which provides both lifecycle management and quality of service for file systems and other storage, it is helpful to describe information about file systems and techniques used for quality of service for file systems.

In an exemplary embodiment, a file system is a conventional file system, which is a structured organization of data, where the data is organized into named entities called files, each can have zero to a system-defined limit of bytes. There are special files called directories that contain names of other files or directories. Files and directories have attributes such as owner and group ids, creation, modification, and access time, size, and so on. When files are organized hierarchically, there is a unique file called the root of the file system. Data that describes files and directories is called meta-data.

In certain commercial operating systems, such as AIX by IBM, a file system is created using one or more logical volumes, where the logical volumes are abstractions. See Vanel et al., "AIX Logical Volume Manager, from A to Z: Introduction and Concepts," IBM, First Edition, January 2000.

Other operating systems employ similar concepts. A logical volume is created using one or more physical volumes. A physical volume may be a disk or a partition of a disk that is directly attached to a server, or a physical volume may be a virtual disk in a Storage Area Network (SAN), which is commonly referred to as LUN (Logical Unit Number). Presently, administrators create files systems using any available storage containers such as physical and logical volumes, as there is no requirement or support for quality of service enabled file system creation.

In the present invention, a storage container comprises a collection of storage objects (e.g., any persistent memory structure that can be used for storage, such as hard disks, segments, regions, and feature objects). A storage container consumes one set of storage objects and produces a new set of storage objects. One common subset of storage containers is a logical volume. In general, the present invention will typically be used for storage containers that expose a "disk-like" interface, such as one would see in the logical volumes.

U.S. patent application Ser. No. 10/449,269, entitled "Policy-Based, Autonomically Allocated Storage," filed on May 29, 2003 by inventors Murthy V Devarakonda, Bill Arnold, Alla Segal, David M Chess, and Ian N Whalley teaches allocation, monitoring, and re-allocation of storage and creation of storage, under policy constraints. U.S. patent application Ser. No. 10/449,269 is called the "ALOMS-Tango patent application" herein. Specifically, the ALOMS-Tango patent application describes a method for allocating storage in a computer storage system, the method comprising specifying constraints on resource allocation in said computer storage system, analyzing capabilities of the computer storage system and forming analysis results, associating an allocation request with a given quality of service, allocating a portion of available storage in the computer storage system based on at least one policy in said constraints, the analysis results and the quality of service, monitoring the computer storage system in forming a determination that there is a failure to meeting the quality-of-service, reallocating resources in response to the determination that there is a failure to meet the quality-of-service. Policy constraints include selection of a service class, e.g., based on the requesting user and application.

The ALOMS-Tango patent application also teaches that a service class is defined as an abstraction that comprises at least one of performance, availability, space requirements, and security requirements of a storage-using application. Performance requirements comprise at least one of: throughput, response time, and transfer rate. Availability requirements comprise at least one of: storage system up time and error rate. Space requirements comprise at least one of: maximum size, initial size, size increments, and guaranteed size. Security requirements include: a physical location of the storage; who is authorized to access data, and who is authorized is to request new storage or change an existing storage allocation. While the ALOMS-Tango patent application is a tremendous improvement over conventional techniques, that patent application does not describe how to manage lifecycle functions of a file system.

In Brooks et al., "IBM Tivoli Storage Resource Manager: A Practical Introduction," International Technical Support Organization, IBM, August 2003, features are described of a product that monitors file systems for extending sizes of file systems in a plurality of networked computer systems of an enterprise. The product includes agents running on the computer systems for collecting information about individual file systems, and a central server where the information is collected from the distributed agents and analyzed for the purposes of reporting and for extending the size of file systems if the underlying logical volumes have free space. The product can also add additional physical volumes to a logical volume and hence to a file system using a command template and a specific type of SAN storage. The Brooks et al. document does not describe how to add physical volumes with quality of service and also does not describe how to manage lifecycle functions of a file system.

By contrast, in an exemplary embodiment of the present invention, a file system of an existing type may be created in one or more quality of service enabled storage containers (e.g., logical volumes as in the AIX operating system), which are allocated, monitored, or re-allocated. Such allocation, monitoring, and re-allocation may be performed, for instance, as described in the ALOMS-Tango patent application. In an exemplary embodiment, an association between the file system and a corresponding quality of service for the file system is stored in non-volatile memory. Associating appropriate storage containers with a file system and maintaining quality of service requirements throughout the lifecycle of a file system are aspects of this invention.

An exemplary embodiment of the present invention provides an interface by which an administrator can request that a file system with a certain predefined quality of service class be created. For instance, a request to create a file system with a predefined quality of service might be created through the following steps:

(1) Configuring one or more storage containers (e.g., logical volumes) that meet the specified quality of service;

(2) Creating a file system using the one or more storage containers; and (3) Recording an association between the one or more storage containers, a file system, and the quality of service that the file system is required to support.

Creation of a file system is a lifecycle action. Additionally, an exemplary embodiment of the present invention provides an interface by which an administrator can request that an existing file system have other lifecycle actions be performed, such as extending, replicating, moving, or migrating a file system. In these cases, this exemplary embodiment can create (e.g., using techniques disclosed in the ALOMS-Tango patent application) additional storage containers of the required quality of service and then perform necessary extension, replication, movement or migration of the file system onto the newly created storage containers. An exemplary embodiment also provides an interface by which an administrator can request that an existing file system be deleted, optionally after a set retention period. In an exemplary embodiment, to delete a file system, the file system is unmounted (e.g., using "umount") and techniques are performed to remove and erase the logical volumes on which this file system was created. Such techniques may be performed using techniques disclosed in the ALOMS-Tango patent application.

An exemplary advantage of the present invention is that quality of service management and resource arbitration can occur in a distributed environment of existing file system types. It is an added exemplary advantage of this invention that an embodiment of the present invention leverages existing monitoring software and operating systems and does not require data migration to a new file system.

Figure 1A:
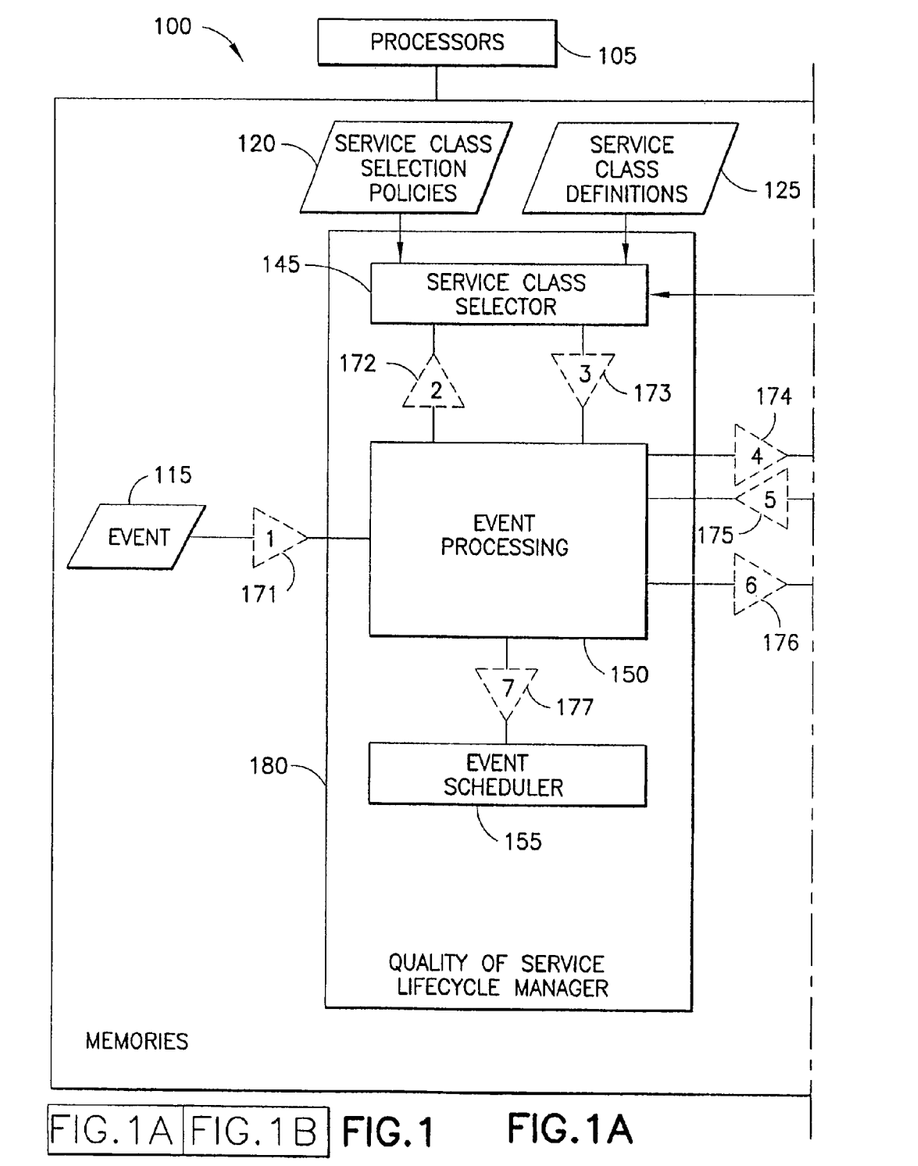
FIGS. 1A and 1B, is a block diagram of an exemplary storage system providing QoS-enabled lifecycle management for file systems.
Figure 1B:
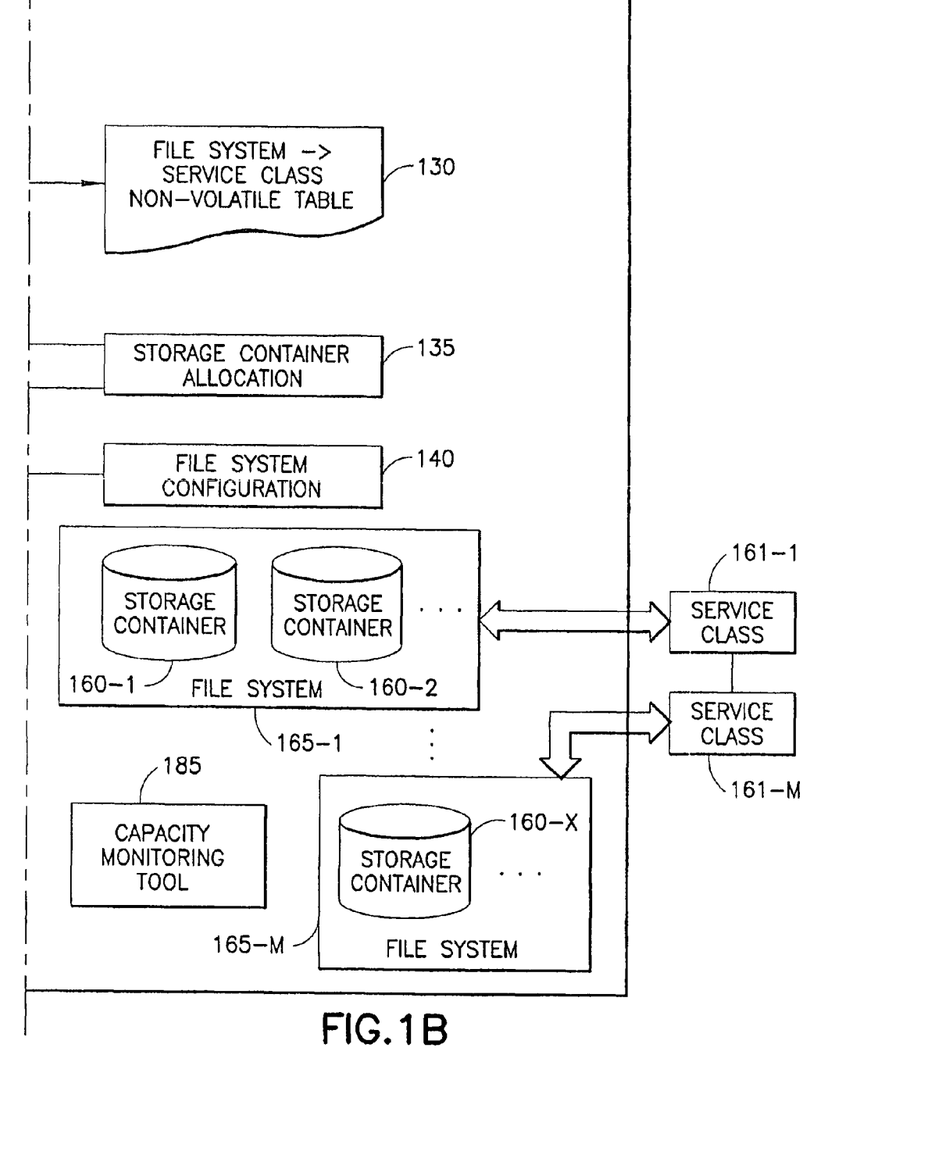

Turning now to FIG. 1, an exemplary storage system 100 is shown that provides QoS-enabled lifecycle management for file systems. Storage system 100 is typically implemented, as shown in FIG. 1, on a distributed computer system comprising a number of processors 105 and a number of memories 110, where the processors 105 and memories 110 are from computer systems interconnected through one or more networks (not shown). However, the storage system 100 could be implemented in a single computer system. Additionally, the storage system 100 could be "embedded" as part of a network-addressable storage device, for instance.

The memories 110 comprise event 115, service class selection policies 120, service class definitions 125, file system to service class non-volatile table 130, storage container allocation module 135, file system configuration module 140, quality of service lifecycle manager 180, storage containers 160, of which storage containers 160-1 through 160-X are shown, and a capacity monitoring tool 185. The quality of service lifecycle manager 180 comprises a service class selector 145, an event processing module 150, and an event scheduler 155. Each file system 165 resides on one or more storage containers 160 and each file system 165 is associated with a service class 161. The association between the service class 161 and the file system 165 is in an exemplary embodiment stored in a table, shown in FIG. 2.

Figure 2:
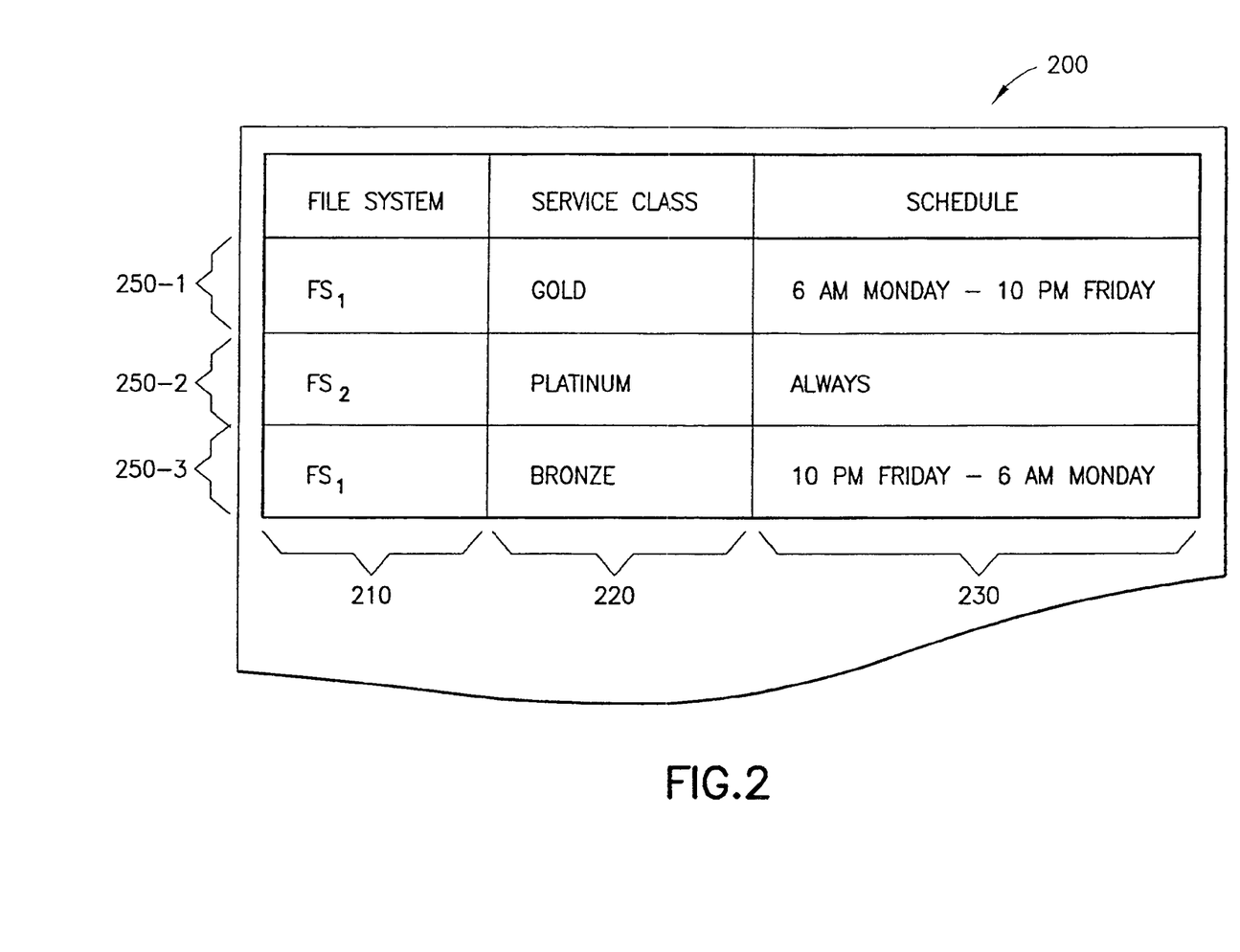
FIG. 2 is an illustration of an exemplary table for storing associations between file systems and service classes.

The service classes 161 are in an exemplary embodiment an abstraction that comprises at least one of performance, availability, space, and security requirements. The service classes 161 in an exemplary embodiment of the present invention describe requirements for file systems 165. The service classes 161 may be named, e.g., Gold, Silver, Bronze, as shown in FIG. 2. While names for service classes 161 are not necessary, names are beneficial and any name may be used that allows administrators to conveniently remember the associated requirements of a file system 165.

Users, typically administrators or other authorized users, specify service class definitions 125 and service class selection policies 120, which act as interfaces between a user and the quality of service lifecycle manager 180. The service class definitions 125 provide definitions of requirements for service classes and also generally provide names (e.g., as described above) for the service classes. For instance, a service class of "Gold" might mean that storage is placed only on highly-available equipment and a high performance rate is to be maintained. A service class of Platinum might mean that very high availability (e.g. with mirrored, redundant highly-available equipment), high security, and very high performance requirements are to be maintained.

The service class selection policies 120 allow service classes 161 to be selected for file systems 165. A policy is, e.g., a rule that defines a choice in the behavior of a system. In many cases, a policy has a conditional part and an action part. In an exemplary embodiment, when the conditional part is evaluated to a Boolean value true, the action part is executed. Furthermore, a policy states constraints under which the storage system should operate. A policy can include a set of constraints. Example policies include: (1) For customerA, applicationDB, and logTableSpaces, use service class Gold; (2) For storage having Gold service classes, notify if throughput falls below 25 percent of the value specified in a service class definitions 125.

A user invokes lifecycle actions at the quality of service lifecycle manager 180, typically through an event 115, which acts as an interface between the user and the quality of service lifecycle manager 180. A lifecycle of a file system 165 is the series of events that occur between creation of the file system 165 (e.g., when the file system 165 can physically be accessed) to deletion of the file system 165 (e.g., when the file system 165 can no longer be accessed).

Note that a user is not the only generator of events 115. A capacity monitoring tool 185 (e.g., to request to extend a file system when space is getting low) and the event scheduler 155 (e.g., to request to migrate a file system at a certain time) may also generate events 115. An exemplary schedule (e.g., a calendar) used by the event scheduler 185 is described in FIG. 2.

Events 115 have event types in an exemplary embodiment, which include the following: Create File System; Delete File System; Extend File System; Migrate File System; Move File System; and Replicate File System. Each of these event types cause a corresponding lifecycle action, methods for which are described in FIGS. 3-9, respectively. An event 115 will generally comprise arguments that identify the file system upon which a lifecycle action is to be taken and the event type, as well as additional information that is unique for a lifecycle action. For example, when a file system of a certain quality of service is needed, an administrator invokes an event 115 having a Create File System event type with the specification of the mount point, server, service class name (e.g., corresponding to a quality of service), and initial size for the file system. It should be noted that the latter event 115 having the Create File system event type is merely exemplary. As another example, a service class 161 could include an initial size for a file system, which means that the event 115 need not contain an initial size. A user and/or application may also be provided for the Create File System event type. A lifecycle action (e.g., method 300 of FIG. 3) to create a file system 165 is performed in response to the event 115.

An administrator can also specify a capacity monitoring policy (e.g., as part of the service class selection policies 120) which the quality of service lifecycle manager 180 uses to instruct a capacity monitoring tool 185 when the capacity monitoring tool 185 should raise an alert (e.g., as an event 115) as a file system 165 begins to fill up from usage (e.g., the remaining capacity of the file system 165 reaches a predetermined remaining capacity).

The file system to service class non-volatile table 130 is one exemplary result of analyzing the service class selection policies 120 and producing associations between file systems 160 and the service classes 161 associated therewith. An exemplary file system to service class non-volatile table is shown in FIG. 2. Note that the file system to service class non-volatile table 130 is optional but beneficial. Without the file system to service class non-volatile table 130, the service class selection policies 120 would typically be analyzed each time an event 115 is received, and such an analysis could be slow. The file system to service class non-volatile table 130 provides much quicker indexing than provided by analyzing the service class selection policies 120. Note that the file system to service class non-volatile table 130 would typically be updated or re-determined when changes are made to the service class selection policies 120.

Also shown in FIG. 1 is a series of exemplary steps 171-177, which illustrate how data flow might occur in the storage system 100. In step 171, an event 115 is passed to the quality of service lifecycle manager 180. The event 115 includes, in an exemplary embodiment as described above, event type, file system, and context (user, application, and the like). In step 172, the event processing module 150 processes the event 115 and communicates a processed version of the event 115 to the service class selector 145. The service class selector 145 determines the service class 161 for the file system 165 in the event 115. Beneficially, this is done by lookup in the file system to service class non-volatile table 130 for known file systems (e.g., file systems 165 already created and appearing in the file system to service class non-volatile table 130). Typically, any events 115, other than events 115 having a Create File System event type, that relate to file systems 165 not yet created will cause an error.

In step 173, the service class selector 145 communicates the service class to the event processing module 150. The event processing module 150 communicates, in step 174, to the storage container allocation module 135 the service class and other information (e.g., space requirements) so that the storage container allocation module 135 can set up a suitable storage container 160. The storage container allocation module 135 sets up an appropriate storage container 160. Storage containers 160 are allocated with a target service class. It is assumed that each storage container 160 (e.g., or an entity in communication with a storage container 160) supports and enforces quality of service. The present invention enables and maintains quality of service for file systems 165 by, e.g., making sure that a file system 165 is stored in appropriate storage container(s) 160 at all times, throughout the lifecycle of the file system 165.

In step 175, the storage container allocation module 135 informs the event processing module 150 that the storage container has been set up. The event processing module 150 in step 176 then communicates to the file system configuration module 140 information (e.g., a reference to the storage container 160) used to set up a file system 165. Exemplary references to the storage container 160 include logical volume identifiers, physical volume identifiers, volume groups, disk drive letters, Small Computer System Interface (SCSI) Logical Unit Numbers (LUNs), SCSI targets, device serial numbers, Common Information Model (CIM) object paths, and Universal Naming Convention (UNC) paths. The file system configuration module 140 then configures or reconfigures the file system 165 to use associated storage container(s) 160.

In step 177, which is optional, the event scheduler 155 schedules known events 115 (e.g., data retention period expiration). Scheduling may be performed in another part of the quality of service lifecycle manager 180 if desired.

It should be noted that steps 171-177 may be performed through, for instance, messages, methods performed by objects, and any other suitable technique. Furthermore, steps 171-177 are merely exemplary and some or all of them need not be performed. Additionally, the present invention may be performed by a signal bearing medium tangibly embodying a program of machine-readable instructions. The machine-readable instructions are executable by a digital processing apparatus (such as a storage system 100) to perform operations for lifecycle management for file systems. Furthermore, typically the quality of service lifecycle manager 180 and other entities in memory(ies) 110 would be implemented as software and brought into the processor(s) 105 in order to configure the processor(s) 105 to perform operations for lifecycle management of file systems. It should also be noted that the entities in memory(ies) 110 could also be implemented as hardware (e.g., as a semiconductor circuit and/or part of a programmable gate array), or implemented as some combination of hardware and software.

An exemplary table 200 is shown in FIG. 2 for storing associations between file systems and service classes. In the example of FIG. 2, there are a number of entries 250-1, 250-2, and 250-3. Each entry 250 has a file system name 210, a service class name 220, and a schedule 230. The file system section has a name (e.g., $FS_1$, $FS_2$, and $FS_1$). Each entry 250 provides an association between the file system name 210 and the service class name 220. A file system name 210 in an exemplary embodiment is simply a unique, opaque, identifier corresponding to a file system 165. The file system name 210 could be a character string, a pointer, or some type of data structure with multiple fields (e.g. field-1: server address, field-2: server-specific pointer and additional fields are possible). A part of meta-data for the file system name 210 may contain a special, unique identifier that identifies the file system, and this could be the "name" for the file system 165.

The service class names 220 are Gold, Platinum, and Bronze, and each of these has a corresponding defined set of requirements (e.g., in service class definitions 125) for a service class 161. As with the file system name 210, each of the service class names 230 is typically a unique, opaque, identifier corresponding to a service class 161. The schedule 230, which is optional, indicates when the service class 220 is valid.

In this example, a file system has a service class name 220 of Bronze for weekends and Gold for weekdays. On Friday at 10 p.m., the file system named $FS_1$ is migrated (see, e.g., FIGS. 7A and 7B) from the service class 161 associated with the service class name 220 "Gold" to the service class 161 associated with the service class name 220 "Bronze." Similarly, on Monday at 6 a.m., the file system named $FS_1$ is migrated (see, e.g., FIGS. 7A and 7B) from the service class 161 associated with the service class name 220 "Bronze" to the service class 161 associated with the service class name 220 "Gold." The file system named $FS_2$ has a service class name 230 of Platinum and has a schedule 230 of "Always," which means that the Platinum service class is valid until modified by a user.

The schedule 230 could be used, for instance, by the event scheduler 155 of FIG. 1, which would generate events 115 as per the schedule 240. For instance, an event 115 could be generated at 10 p.m. on Friday to migrate the file system $FS_1$ from Gold service class, to the Bronze service class.

Figure 3A:
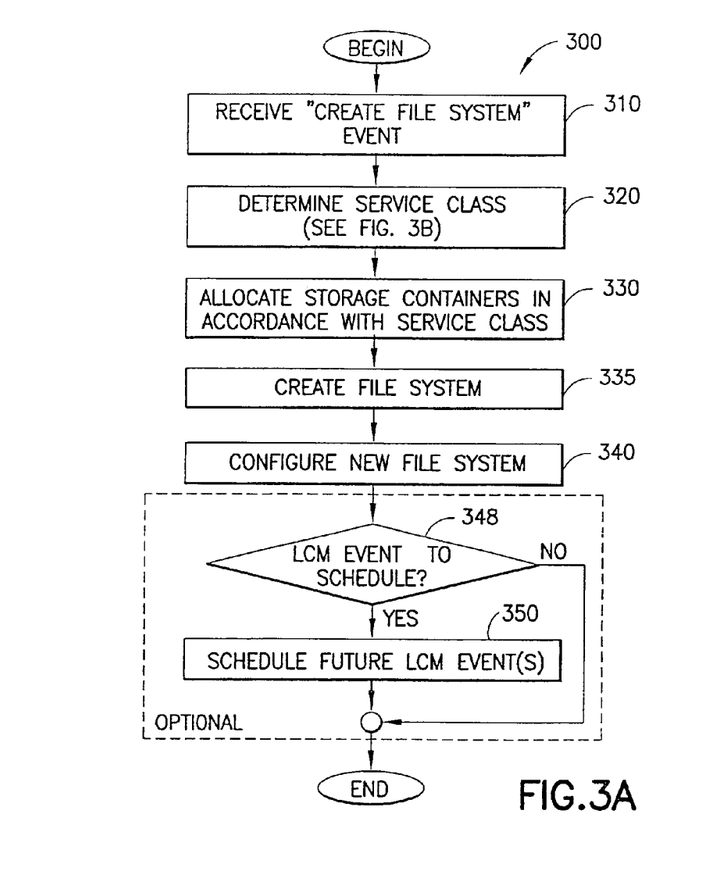
FIGS. 3A and 3B, is a flowchart of an exemplary method for creating a file system.
Figure 3B:
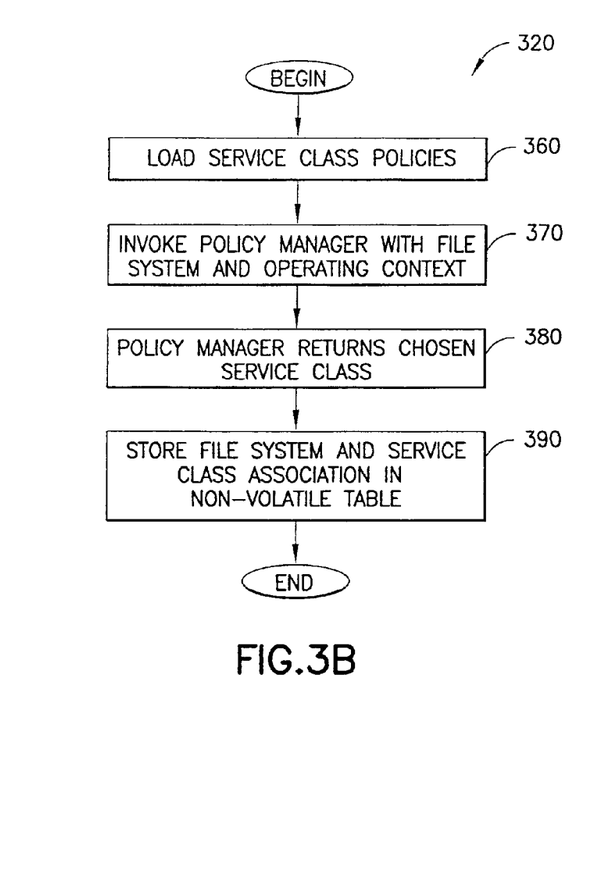

Turning now to FIG. 3, including FIGS. 3A and 3B, an exemplary method 400 is shown for creating a file system 165. As described in FIG. 3A, when a "Create File System" event is received (step 310) the quality of service lifecycle manager 180 determines the service class 161 (step 320) and allocates a storage container 160 with the appropriate service class 161 (step 330). In an exemplary embodiment, step 330 is performed by having the quality of service lifecycle manager 180 invoke storage container allocation by calling the storage container allocation module 135. The storage container allocation module 135 creates a storage container 160 of the specified service class 161.

It should be noted that in certain systems, storage allocation (e.g., performed by a storage container allocation module 135) may expect as input a storage container service class instead of a file system service class 161. A description associated with a storage container service class can be derived from a description associated with a service class 161 for file systems 165. For instance, a description for a service class for a storage container 160 may contain a block-level Input/Output Per Second (IOPS) throughput metric and a description for a file system service class 161 may contain a file-level MBps (Megabyte per second) bandwidth metric. Rough approximations of block-level metrics may be obtained by simple computations based on the file-level metrics. More accurate block-level metrics may be obtained with detailed knowledge of the storage container internals (e.g., cache size, block size, intermediate components, and more). Typically, those skilled in the art can create appropriate storage system service class transformations which will provide sufficient performance that meets or exceeds the performance requirements in the file system service classes 161.

In step 335, the quality of service lifecycle manager 180 creates a file system 165 using the storage container 160. Typically, step 335 entails formatting and otherwise manipulating the storage container(s) 160 so that the structure of the file system 165 can be stored on the storage container(s) 160. For example, in UNIX, step 335 could be performed with the "mkfs" command. In Disk Operating System (DOS), step 335 could be performed with the Format command, and Windows provides a Graphical User Interface (GUI) which allows one to interact with the Windows Disk Management Service to create the file system 161 on the storage container(s) 160. Note that step 335 can be automated.

In step 340, the quality of service lifecycle manager 180 configures the new file system 165 (e.g., by invoking the file system configuration module 140). Generally, step 340 involves one or more steps to allow a computer system to access the file system 165. For example, in the UNIX, step 340 may be performed using the "mount" command. In Windows/DOS, one could configure (e.g., including reconfiguring) file systems 165 using the "NET USE" command for instance, through the Disk Management GUI and the "Rescan Disks" command, and/or the "Change Drive Letter" command. Step 340 may also be automated.

Once a file system 165 is created, monitoring of the file system 165 may commence, if desired, using steps 345 and 350. For instance, a capacity monitoring tool 185 could recognize the new file system 165 and start monitoring the capacity of the new file system 165. The quality of service lifecycle manager 180 sends any capacity monitoring policies for the file system 165 to the (e.g., distributed) capacity monitoring tool 185 to guide the monitoring and alerting process. If there is a quality of service lifecycle manager (LCM) 180 event 115 to schedule, the capacity monitoring tool 185 can schedule such an event in step 450. Additionally, the event scheduler 155 can use steps 345 and 350 to schedule events such as those shown in schedule 240 of FIG. 2.

In an exemplary embodiment, FIG. 3B, the quality of service lifecycle manager 180 determines the service class 161 using, e.g., a service class selector 145, which acts as a policy manager. The quality of service lifecycle manager 180 invokes (step 365) the service class selector 145 with a set of service class selection policies 120 (step 360) and information from the event 151. This information may contain, as described above, the event type, the name of the file system 165, and contextual information such as the identity of the user and/or application making the request. The service class selector 145 (e.g., acting as a policy manager) examines this information and returns a service class 161. This occurs in step 380. An association between the file system 165 and the service class definition is then, in an exemplary embodiment, stored in non-volatile memory (e.g., as file system to service class non-volatile table 130/200) for quick reference (step 390).

In alternate embodiments, the quality of service lifecycle manager 180 determines the service class 161 by table lookup (e.g., using file system to service class non-volatile table 130/200), prompting the user via a user interface, and/or by referencing a service class name which may optionally included in the lifecycle event.

Figure 4A:
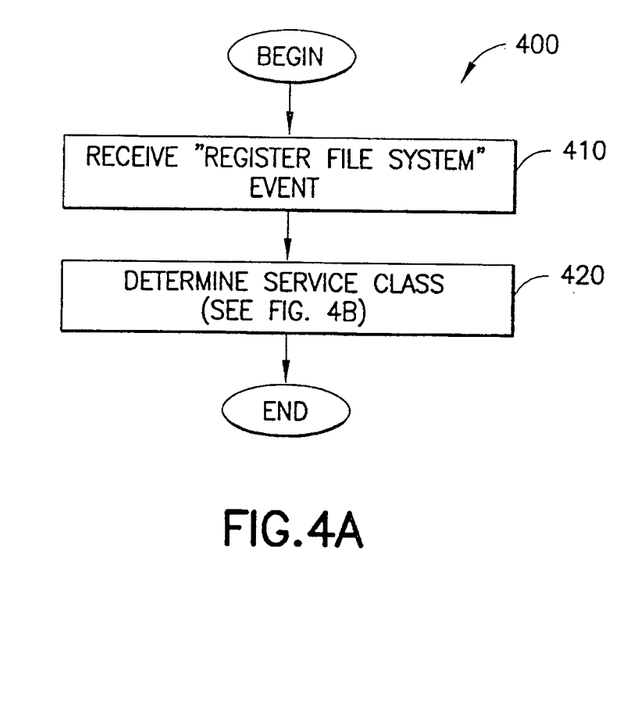
FIGS. 4A and 4B, is a flowchart of an exemplary method for registering a file system.
Figure 4B:
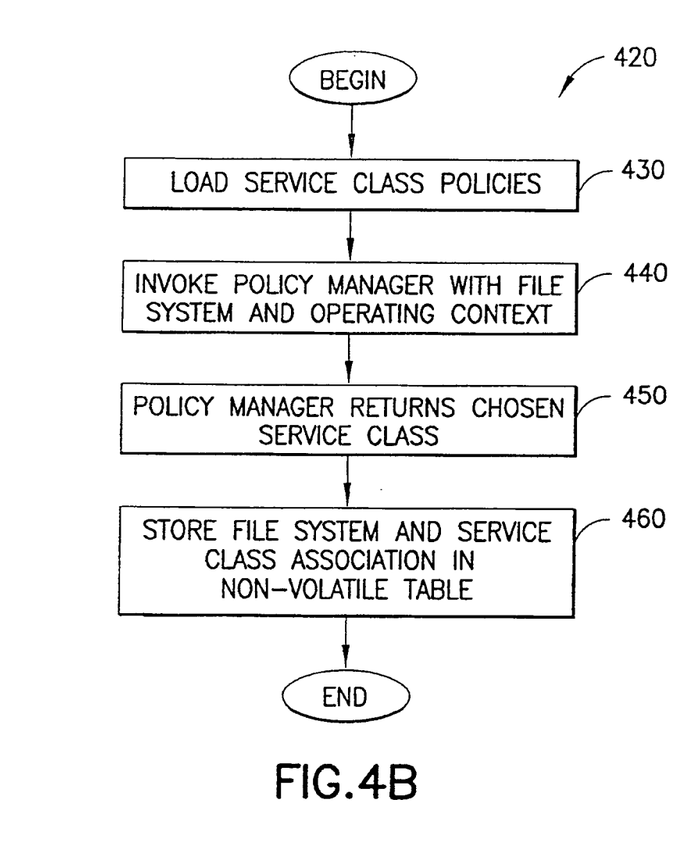

Turning now to FIG. 4, including FIGS. 4A and 4B, an exemplary method 400 is shown for registering a file system. Registration may be performed, for instance, to ensure that the file system 161 is entered into the file system to service class non-volatile table 130. In step 410 of FIG. 4A, a "Register File System" event 115 is received. In step 420, the service class 161 is determined for the file system 161, which registers the files system 165 in the file system to service class non-volatile table 130.

In FIG. 4B, step 420 is shown in greater detail. In step 430, the service class selection policies 120 are loaded. The service class selector 145, acting as a policy manager, is invoked (e.g., by the event processing module 150) with the file system 165 (e.g., a reference to the file system 165, such as file system name 210) and with operating context. The service class selector 145 determines the chosen service class 161 (step 450) and stores the association between the file system 165 and the service class 161 in the file system to service class non-volatile table 130 (step 460). Registration, while not required, has a benefit of faster determination of the association between a file system 165 and a corresponding service class 161 and allows the quality of service lifecycle manager 180 to determine more easily whether a lifecycle action is requested on a registered file system 165.

Figure 5A:
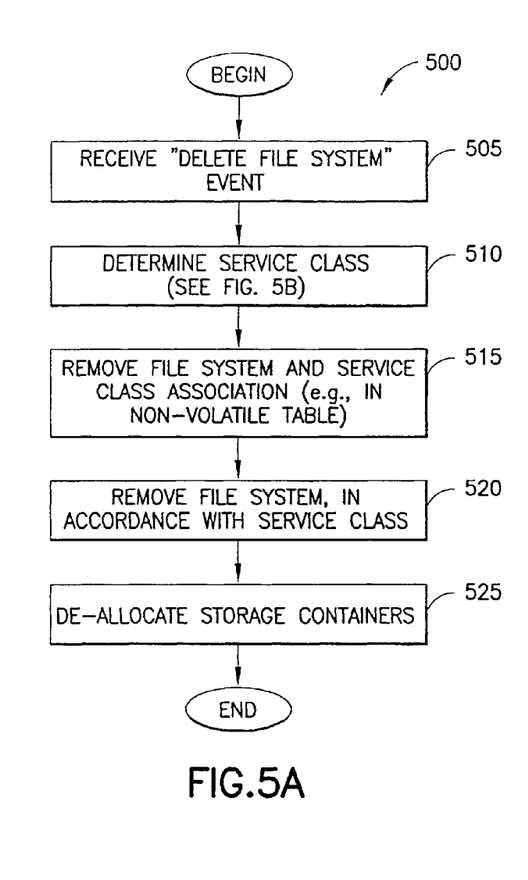
FIGS. 5A and 5B, is a flowchart of an exemplary method for deleting a file system.
Figure 5B:
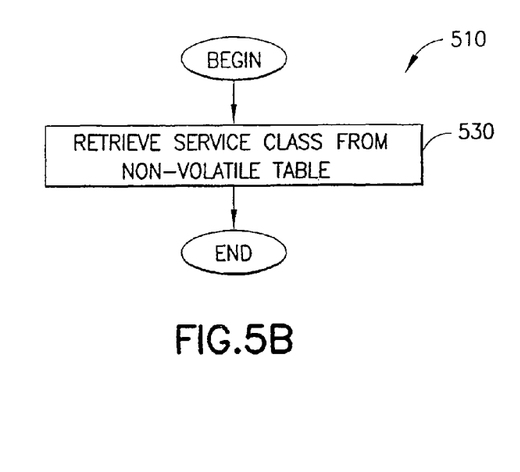

Referring now to FIG. 5, including FIGS. 5A and 5B, an exemplary method 500 is shown for deleting a file system. When a "Delete File System" event 115 is received (step 505), the service class 161 is determined in step 510 through techniques already described above. In step 515, the quality of service lifecycle manager 180 removes the file system 165 and, if necessary, the association in the file system to service class non-volatile table 130/200 between the file system 165 and the storage container 160. Note that it is assumed that a confirmation process, if any, has already been gone through and such as process is not included in FIG. 3 but may be included if desired. Such confirmation process would typically have steps modified at least partially by the service class 161. For instance, a Platinum service class might require multiple confirmations and/or passwords, while a Generic service class might only require a simple confirmation.

In step 520, the file system is deleted (e.g., removed) in accordance with the service class 161. The service class 161 is checked to see if there are special disposal instructions, such as data being required to be securely scrubbed from a disk. Any disposal instructions are followed in step 520. In step 525, the storage containers are de-allocated.

Note that any capacity monitoring tool 185 will recognize the deletion of the file system 165 and will make appropriate changes to the internal functionality of the capacity monitoring tool 185.

As indicated in FIG. 5B, one way to determine a service class 161 is by retrieving a service class 161 from a file system to service class non-volatile table 130/200 (step 530).

Figure 6A:
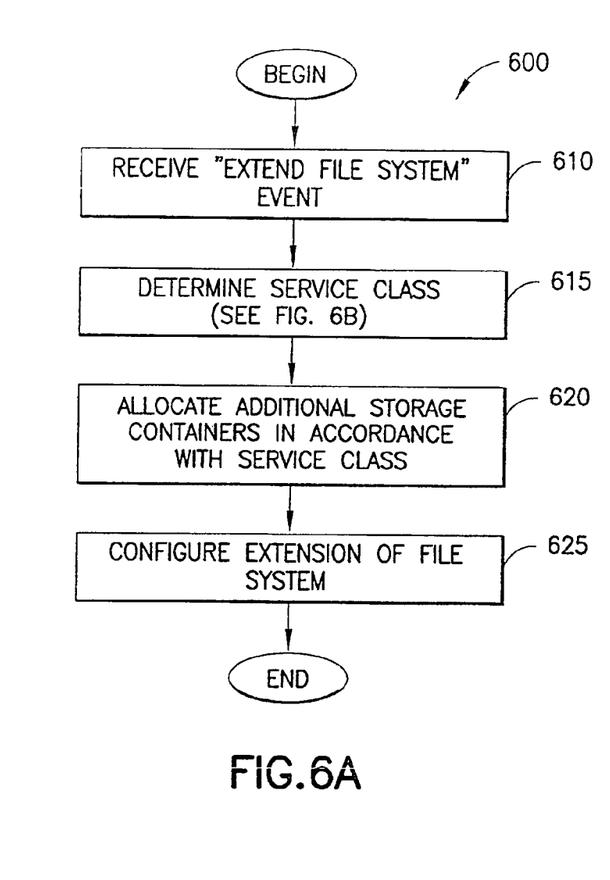
FIGS. 6A and 6B, is a flowchart of an exemplary method for extending a file system.
Figure 6B:
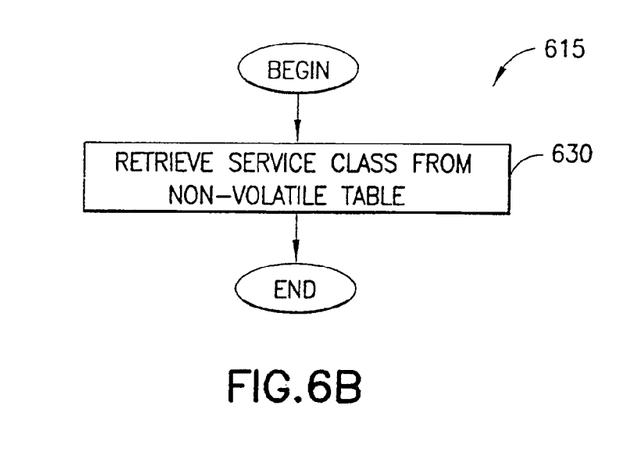

Turning now to FIG. 6, including FIGS. 6A and 6B, an exemplary method 600 is shown for extending a file system. When a file system 165 is reaching a size limit, a capacity monitoring tool 185 can recognize the event and based on the policies (e.g., determined through service class selection policies 120) in effect, the capacity monitoring tool 185 will generate an alert to the quality of service lifecycle manager 180. In the example of FIG. 6, the alert is an "Extend File System" event 115. The quality of service lifecycle manager 180 determines the service class 161 (step 615) for the file system 165 in the event 115, e.g. by retrieving the service class 161 from the file system to service class non-volatile table 130/200 (step 630). The quality of service lifecycle manager 180 requests (step 620) the storage container allocation module 135 to extend the previously allocated storage for the file system 165 while maintaining the quality of service as defined by the service class 161. The storage container allocation module 135 might extend the physical volumes on which the storage container 160 (e.g., as a logical volume) is created, or the storage container allocation module 135 might create a new physical volume and extend the storage container 160 (e.g., as a logical volume) over the added physical volume, and all of this is done while maintaining the service class requirements. If the request is successful, then the quality of service lifecycle manager 180 configures the extended file system 165 (step 625). If the request is denied, then the quality of service lifecycle manager 180 reports a failure to extend the file system to the user.

Figure 7A:
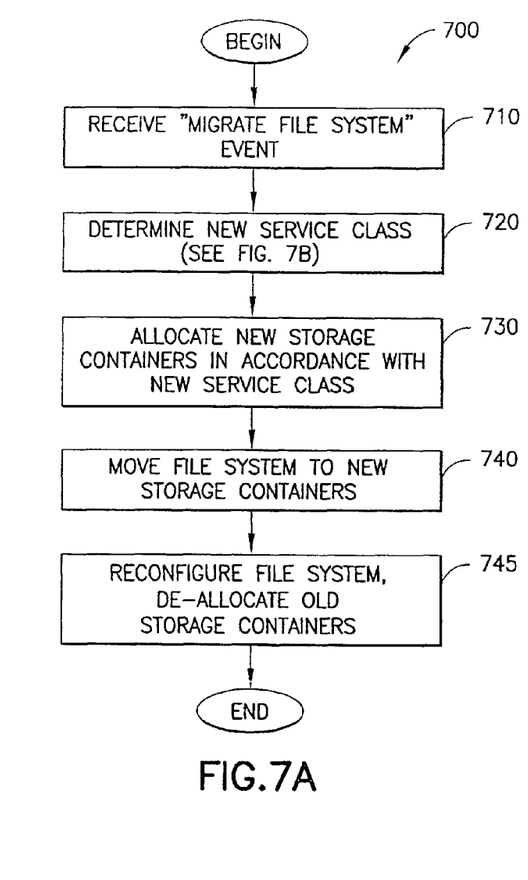
FIGS. 7A and 7B, is a flowchart of an exemplary method for migrating a file system.
Figure 7B:
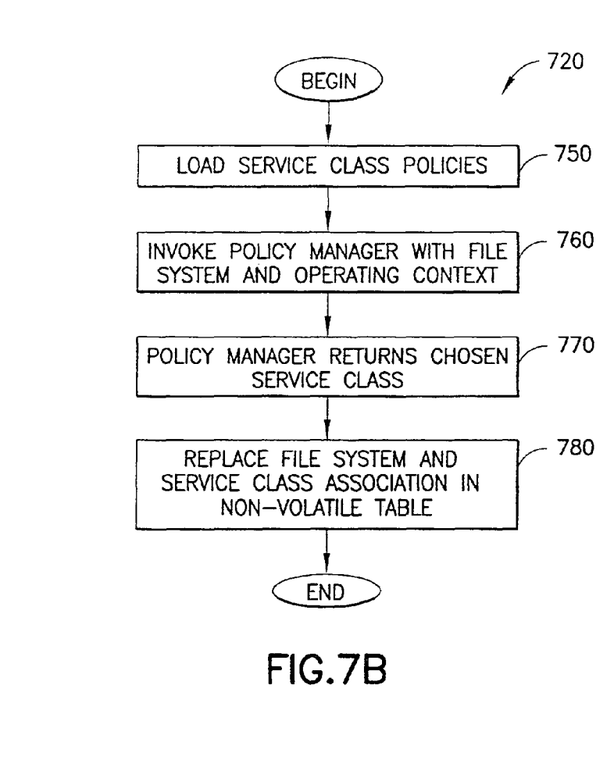

Turning now to FIG. 7, including FIGS. 7A and 7B, an exemplary method 700 is shown for migrating a file system. Migrating is a process where the old file system has a particular service class 161 and the new file system is to have a different service class 161. FIG. 7 illustrates one way of performing migration, which is to create a new file system and to fill the new file system with data from the old file system.

As described in FIG. 7A, when a "Migrate File System" event 115 is received (step 710) the quality of service lifecycle manager 180 determines the service class 161 (step 720) and allocates a storage container 160 (e.g., or storage containers 16) with the appropriate service class 161 (step 730). In an exemplary embodiment, step 730 is performed by having the quality of service lifecycle manager 180 invoke storage container allocation by calling the storage container allocation module 135. The storage container allocation module 135 creates a storage container 160 (e.g., or storage containers 160) of the specified new service class 161.

In step 740, the quality of service lifecycle manager 180 moves the file system 165 to the new storage container(s) 160. When the file system 165 is moved, the structure of the file system 165 is copied or otherwise recreated on the new storage container(s) 160. The move could be done through the Unix "dd" (disk dump) command. On Windows, one might use a program such as Partition Magic. Additionally, one storage container 160 may be copied to another storage container 160, while preserving internal data structures, using, e.g., FlashCopy techniques or PPRC (Peer-to-Peer Remote Copy).

In step 745, the quality of service lifecycle manager 180 reconfigures file system 165 and de-allocates the old storage container(s) 160 (e.g., by invoking the storage container allocation module 135, which performs the de-allocation). Reconfiguration of the file system 165 is performed to so that computer systems accessing the file system 165 function correctly with the new storage containers 160. The reconfiguration of the file system 165 may be performed, in part, by using commands (e.g. "mount", "NET USE") as described in step 340, above.

In an exemplary embodiment, FIG. 7B, the quality of service lifecycle manager 180 determines the service class 161 using a service class selector 145, which acts as a policy manager. The quality of service lifecycle manager 180 invokes (step 760) the service class selector 145 with a set of service class selection policies 120 (step 750) and information from the event 151. This information may contain, as described above, the event type, the name of the file system 165, and contextual information such as the identity of the user and/or application making the request. The service class selector 145 (e.g., acting as a policy manager) examines this information and returns a service class 161. This occurs in step 770. In step 780, an association between the new file system 165 and the service class definition is, in an exemplary embodiment, stored in non-volatile memory (e.g., as file system to service class non-volatile table 130/200). The new association replaces the old association between the old service class 161 and the old file system 165.

Figure 8A:
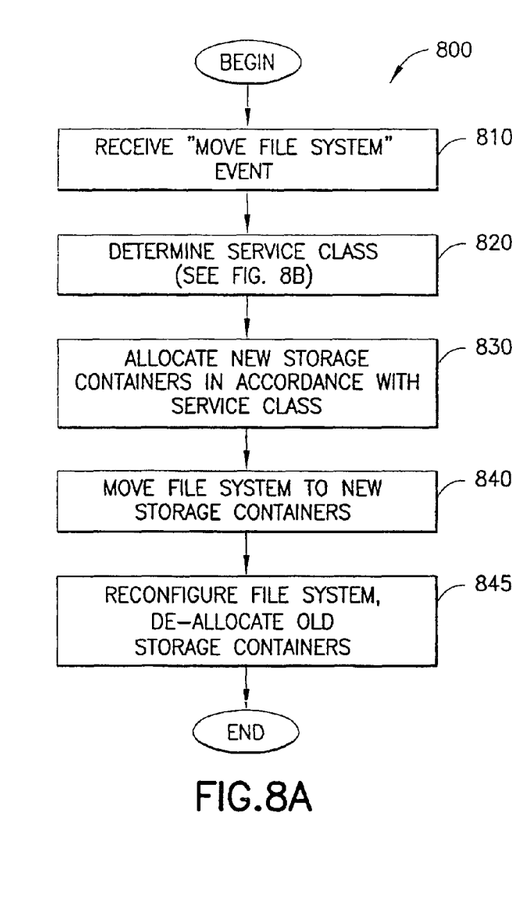
FIGS. 8A and 8B, is a flowchart of an exemplary method for moving a file system.
Figure 8B:
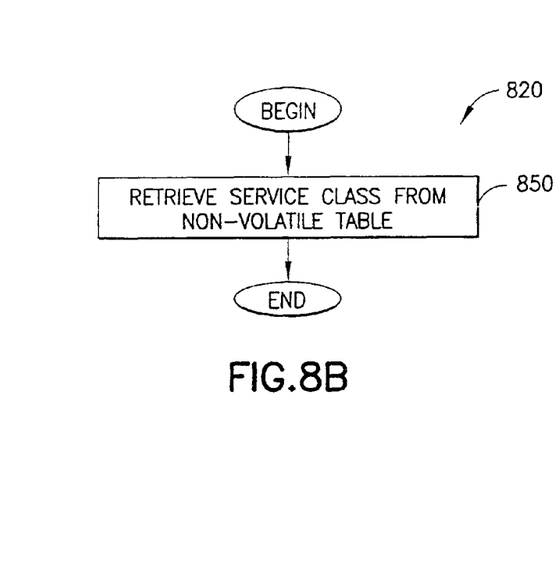

Referring now to FIG. 8, including FIGS. 8A and 8B, an exemplary method 800 is shown for moving a file system 165. As described in FIG. 8A, when a "Move File System" event 115 is received (step 810) the quality of service lifecycle manager 180 determines the service class 161 (step 820) and allocates new storage container(s) 160 with the appropriate service class 161 (step 830). Note that a file system 165 would also be created in step 830. In an exemplary embodiment, in step 850 of FIG. 8B, the appropriate service class 161 is retrieved from file system to service class non-volatile table 130/200.

The quality of service lifecycle manager 180 moves (step 840) the old file system 165, removes the old file system (step 845), and de-allocates (step 845) the old storage containers (e.g., by invoking the storage container allocation module 135, which performs the de-allocation). It should be noted that associations between the file system 165 and the storage containers 160 should also be updated.

Figure 9A:
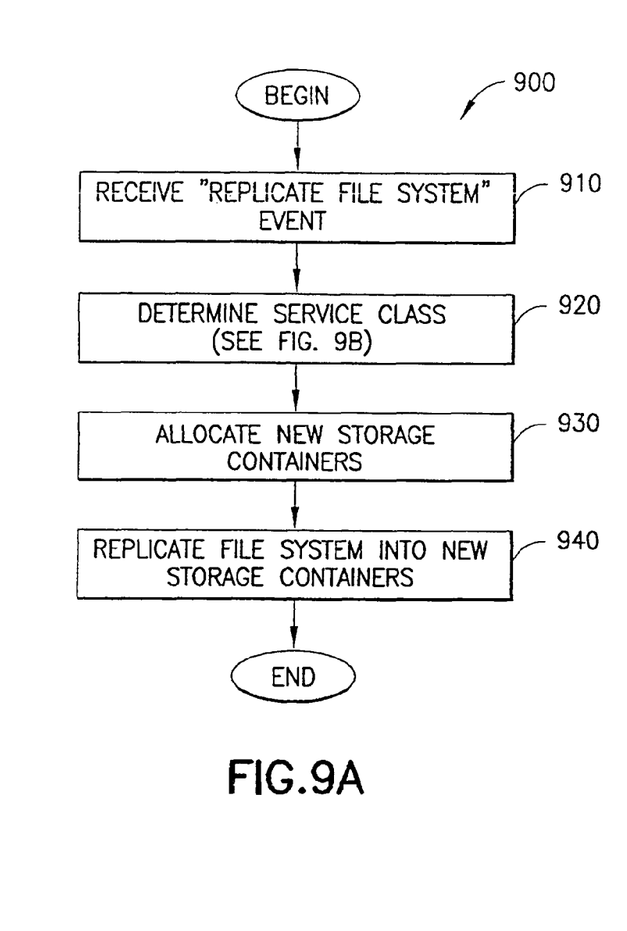
FIGS. 9A and 9B, is a flowchart of an exemplary method for replicating a file system.
Figure 9B:
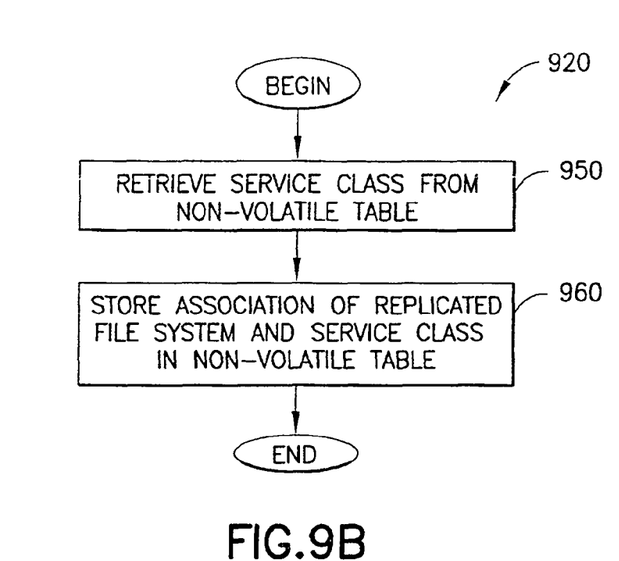

FIG. 9, including FIGS. 9A and 9B, an exemplary method 900 is shown for replicating a file system. As described in FIG. 9A, when a "Replicate File System" event 115 is received (step 910) the quality of service lifecycle manager 180 determines the service class 161 (step 920) and allocates new storage container(s) 160 with the appropriate service class 161 (step 930). Note that a file system 165 would also be created in step 930. In an exemplary embodiment, in step 950 of FIG. 9B, the appropriate service class 161 is retrieved from file system to service class non-volatile table 130/200. Additionally, in step 960 of FIG. 9B, the association between the replicated file system and the service class is stored in the file system to service class non-volatile table 130/200. The quality of service lifecycle manager 180 replicates (step 940) the file system 165 to the new storage containers 160.

While a typical use of the present invention is for conventional file systems 165, the techniques presented herein could be adapted to provide quality of service lifecycle management of other types of persistent data organization (such as databases) and virtualized storage. For example, IBM makes a product, called IBM SAN Volume Controller Software for the Cisco MDS 9000 (SANVC4MDS), which performs "Volume Virtualization." This SANVC4MDS acts as a storage container by creating virtualized disk volumes out of collections of storage subsystem volumes (e.g., storage containers 165). Just as the present invention provides quality of service lifecycle management for file systems, the invention could also provide quality of service lifecycle management for file systems for the virtual volumes created by the SANVC4MDS.

The embodiments of this invention may be implemented by computer software executable by one or more processors (e.g., processors 105) or by other hardware circuitry, or by a combination of software and hardware circuitry. Further in this regard it should be noted that the various blocks of the flow diagrams of FIGS. 3A-9B may represent program steps (e.g., defined by software), or interconnected logic circuits, blocks and functions, or a combination of program steps and logic circuits, blocks and functions for performing the specified tasks. Circuitry includes semiconductor circuits, processors such as digital signal processors or general purpose processors, and programmable logic devices.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. Nonetheless, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A method for lifecycle management for file systems, comprising:
  receiving a request to create a file system with a predefined quality of service;
    allocating, by a processor, at least one storage container associated with a service class that is one of a plurality of quality service classes and configuring the at least one storage container to meet the predefined quality of service;
    creating the requested file system on the at least one allocated storage container through a lifecycle action invoked by an event, wherein the file system is associated with the service class, wherein the file system comprises a structured organization of data files, where after being created, said file system becomes one of a plurality of the file systems each stored on an allocated storage container;
    wherein in addition to being configured to create the file system through the lifecycle action, said processor is configured to provide said lifecycle actions performed on the file systems at least for registering, extending, replicating, moving, migrating and deleting any file system of the file systems in response to the event; and
    using the associated service class during lifecycle actions performed on the file system, wherein each lifecycle action of the lifecycle management for the file systems is invoked by an event comprising an identification of an event type and an identification of one file system of the file systems having one associated service class of the plurality of the service classes, said each lifecycle action being performed on the identified one file system.

2. The method of claim 1, further comprising determining an association between the file system and the service class, wherein determining the association between the file system and the service class comprises analyzing a set of policies and determining the association based on the analysis.

3. The method of claim 1, further comprising determining an association between the file system and the service class, wherein determining the association between the file system and the service class comprises accessing a table comprising the association.

4. The method of claim 3, wherein accessing a table further comprises:
  accessing the table to compare a given name corresponding to the file system and first names stored in the table corresponding to created file systems;
  in response to a match between the given name and one of the first names stored in the table, determining a second name corresponding to a given service class and to the first name; and
  determining the association so that the file system is associated with the given service class.

5. The method of claim 1, wherein said using comprises:
  in response to an event requesting registration of the file system, determining the service class based on at least service class policies; and
  storing the association between the file system and the service class in memory.

6. The method of claim 5, wherein said storing comprises storing the association between the file system and the service class in a table, where the service class corresponds to a quality of service that the file system is required to support.

7. The method of claim 1, wherein said using, in response to an event requesting deleting of the file system, comprises:
  removing the file system; and
  de-allocating the at least one storage container.

8. The method of claim 7, wherein the deleting of the file system further comprises performing a confirmation process that is at least partially determined by the service class.

9. The method of claim 7, wherein the deleting of the file system further comprises performing at least one disposal instruction on the file system, the at least one disposal instruction corresponding to the service class.

10. The method of claim 1, wherein said using further comprises allocating at least one additional storage container, the at least one storage container associated with the service class, wherein the at least one additional storage container comprises an extension of the file system.

11. The method of claim 1, wherein said using further comprises:
  allocating at least one additional storage container, the at least one additional storage container associated with a second service class;
  moving the file system from the at least one storage container to the at least one additional storage container; and
  associating the file system with the second service class.

12. The method of claim 11, further comprising de-allocating the at least one storage container.

13. The method of claim 1, wherein said using further comprises:

allocating at least one additional storage container, the at least one additional storage container associated with the service class;

moving the file system from the at least one storage container to the at least one additional storage container; and de-allocating the at least one storage container.

14. The method of claim 1, wherein said using further comprises:

allocating at least one additional storage container, the at least one additional storage container associated with the service class;

replicating the file system on the at least one additional storage container.

15. The method of claim 1, wherein:

the method further comprises the step of specifying the service class associated with the file system; and allocation further comprises allocating the at least one storage container so that the at least one storage container is associated with the specified service class.

16. The method of claim 1, wherein:

the service class comprises a file system service class;

the method further comprises determining a storage system service class by using the file system service class; and allocation further comprises allocating the at least one storage container so that the at least one storage container has the determined storage system service class.

17. The method of claim 1, further comprising configuring the file system for access.

18. The method of claim 1, wherein said quality of service comprises goals at least corresponding to capacity, performance and availability requirements.

19. The method of claim 1, further comprising generating the event when a remaining capacity of the file system is below a predetermined remaining capacity.

20. The method of claim 1, further comprising generating the event when a schedule indicates the event should be generated.

21. An apparatus for lifecycle management for file systems, the apparatus comprising:

at least one memory; and at least one processor coupled to the at least one memory, the at least one processor configured to:

receive a request to create a file system with a predefined quality of service;

allocate, by a processor, at least one storage container associated with a service class that is one of a plurality of quality service classes and configuring the at least one storage container to meet the predefined quality of service;

create the requested file system on the at least one allocated storage container through a lifecycle action, wherein the file system is associated with the service class, wherein the file system comprises a structured organization of data files, where after being created, said file system becomes one of a plurality of the file systems each stored on an allocated storage container;

wherein in addition to being configured to create the file system through the lifecycle action, said processor is configured to provide said lifecycle actions performed on the file systems at least for registering, extending, replicating, moving, migrating and deleting any file system of the file systems in response to the event; and use the associated service class during lifecycle actions performed on the file system, wherein each lifecycle action of the lifecycle management for the file systems is invoked by an event comprising an identification of an event type and an identification of one file system of the file systems having one associated service class of the plurality of the service classes, said each lifecycle action being performed on the identified one file system.

22. The apparatus of claim 21, wherein the at least one storage container comprises at least one of a logical volume, a database, and a file.

23. A memory embodying a program of machine-readable instructions executable to perform operations for lifecycle management for file systems, the operations comprising:

receiving a request to create a file system with a predefined quality of service;

allocating, by a processor, at least one storage container associated with a service class that is one of a plurality of quality of service classes and configuring the at least one storage container to meet the predefined quality of service of service;

creating the requested file system on the at least one allocated storage container through a lifecycle action, wherein the file system is associated with the service class, wherein the file system comprises a structured organization of data files, where after being created, said file system becomes one of a plurality of the file systems each stored on an allocated storage container;

wherein in addition to being configured to create the file system through the lifecycle action, said processor is configured to provide said lifecycle actions performed on the file systems at least for registering, extending, replicating, moving, migrating and deleting any file system of the file systems in response to the event; and using the associated service class during lifecycle actions performed on the file system, wherein each lifecycle action of the lifecycle management for the file systems is invoked by an event comprising an identification of an event type and an identification of one file system of the file systems having one associated service class of the plurality of the service classes, said each lifecycle action being performed on the identified one file system.

24. An apparatus for lifecycle management for file systems, comprising:

means for receiving a request to create a file system with a predefined quality of service;

means for allocating, by a processor, at least one storage container associated with a service class that is one of a plurality of quality service classes and configuring the at least one storage container to meet the predefined quality of service;

means for creating the requested file system on the at least one allocated storage container through a lifecycle action, wherein the file system is associated with the service class, wherein the file system comprises a structured organization of data files, where after being created, said file system becomes one of a plurality of the file systems each stored on an allocated storage container;

means for providing, by said processor, said lifecycle actions performed on the file systems at least for registering, extending, replicating, moving, migrating and deleting any file system of the file systems in response to the event; and means for using the associated service class during lifecycle actions performed on the file system wherein each lifecycle action of the lifecycle management for the file systems is invoked by an event comprising an identification of an event type and an identification of one file system of the file systems having one associated service class of the plurality of the service classes, said each lifecycle action being performed on the identified one file system.

25. The apparatus of claim 24, further comprising means for determining the association between the file system and the service class.

26. A method for lifecycle management for file systems, comprising:

receiving a request to create a file system with a predefined quality of service;

allocating, by a processor, at least one storage container associated with a service class that is one of a plurality of quality service classes and configuring the at least one storage container to meet the predefined quality of service;

creating the requested file system on the at least one allocated storage container through a lifecycle action, wherein the file system is associated with the service class, wherein the file system comprises a structured organization of data files, where after being created, said file system becomes one of a plurality of the file systems each stored on an allocated storage container;

wherein in addition to being configured to create the file system through the lifecycle action, said processor is configured to provide said lifecycle actions performed on the file systems at least for registering, extending, replicating, moving, migrating and deleting any file system of the file systems in response to the event; and maintaining the service class of the file system throughout a lifecycle of the file system.

27. The method of claim 26, wherein said maintaining comprises ensuring that the file system is stored at all times in storage containers associated with the storage class.

28. The method of claim 26, further comprising, in response to a modification of the storage class to a new storage class, allocating at least one new storage container associated with the new storage class, moving the file system to the at least one new storage container and deallocating the at least one storage container associated with the storage class.

* * * * *